United States Patent
Matcha et al.

(10) Patent No.: US 12,040,583 B2
(45) Date of Patent: Jul. 16, 2024

(54) T-SPLICE CONNECTOR (71) Applicant: Panduit Corp., Tinley Park, IL (US)

(72) Inventors: Andrew R. Matcha, Chicago, IL (US); Surendra Chitti Babu, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/987,242

(22) Filed: Nov. 15, 2022

(65) Prior Publication Data
US 2023/0361493 A1 Nov. 9, 2023

Related U.S. Application Data (63) Continuation of application No. 17/304,663, filed on Jun. 24, 2021, now Pat. No. 11,527,839.

(60) Provisional application No. 63/048,806, filed on Jul. 7, 2020.

(51) Int. Cl.
| | |
|---|---|
| *H01R 9/05* | (2006.01) |
| *H01R 4/2429* | (2018.01) |
| *H01R 4/2433* | (2018.01) |
| *H01R 11/15* | (2006.01) |
| *H01R 11/09* | (2006.01) |
| *H01R 11/11* | (2006.01) |

(52) U.S. Cl.
CPC ......... *H01R 9/0509* (2013.01); *H01R 4/2429* (2013.01); *H01R 4/2433* (2013.01); *H01R 11/15* (2013.01); *H01R 11/09* (2013.01); *H01R 11/11* (2013.01)

(58) Field of Classification Search
CPC .................................................. H01R 13/6466
See application file for complete search history.

(56) References Cited

U.S. PATENT DOCUMENTS

| | | | |
|---|---|---|---|
| 2,967,795 A | 1/1961 | Bollmeier et al. | |
| 3,715,459 A | 2/1973 | Hoffman | |
| 4,738,009 A | 4/1988 | Down et al. | |
| 4,946,394 A | 8/1990 | Knapp et al. | |
| 5,055,064 A * | 10/1991 | Imaizumi | H01R 9/031 |
| | | | 439/402 |
| 6,402,541 B1 | 6/2002 | Mindeau | |
| 7,503,785 B2 | 3/2009 | Stepniak | |
| 8,007,310 B2 | 8/2011 | Landis et al. | |
| 8,715,002 B2 * | 5/2014 | Fitzpatrick | H01R 27/00 |
| | | | 439/557 |
| 9,149,858 B2 | 10/2015 | Keswani | |
| 9,774,179 B1 | 9/2017 | Marcath et al. | |
| 9,991,638 B2 * | 6/2018 | Straka | H01R 13/6473 |
| 10,998,685 B2 | 5/2021 | Curtis et al. | |
| 11,038,288 B2 | 6/2021 | Peterson et al. | |

FOREIGN PATENT DOCUMENTS

| | | |
|---|---|---|
| WO | 2018200528 A1 | 11/2018 |
| WO | 2019147774 A1 | 8/2019 |
| WO | 2019165466 A1 | 8/2019 |

\* cited by examiner

*Primary Examiner* — Ross N Gushi
(74) *Attorney, Agent, or Firm* — Christopher S. Clancy; James H. Williams; Peter S. Lee (57) ABSTRACT

An apparatus and method for splicing single pair ethernet (SPE) cables. By creating a T shaped intersection, the splicing device allows for sensors and other devices to run perpendicular in relation to the original cable. The splicing device further enables the cable to have multiple drop points along the cable.

18 Claims, 13 Drawing Sheets

T-SPLICE CONNECTOR

CROSS-REFERENCE TO RELATED APPLICATION(S)

This application is a continuation of U.S. patent application Ser. No. 17/304,663, filed Jun. 24, 2021, which claims benefit to U.S. Provisional Patent Application No. 63/048,806, filed Jul. 7, 2020, the entirety of all of which is hereby incorporated by reference herein.

FIELD OF TECHNOLOGY

This disclosure relates to a splicing connector for use with single pair ethernet (SPE) cables. More specifically, a T-shaped splice adapter is disclosed that splices into a SPE cable to enable an additional cable pathway to be created in parallel with the original cable.

BACKGROUND

Single pair ethernet (SPE) cables provide high performance transmission of data and power available while using only a single pair (two wires) of conductive wires. So the SPE cable offers a reduction in cabling material over cables that include two pairs of conductive wires.

With the introduction of SPE cables, new cabling components and accessories are developing for working with the SPE cables in new, or sometimes the same, application scenarios.

SUMMARY

This disclosure relates to a T-splice adapter for splicing into a SPE cable and connecting an external device to the SPE cable in a parallel connection. The T-splice adapter offers a simple and effective use of a cable splicing assembly that can be applied to the specific features of a SPE cable.

According to an embodiment, a cable splicing device is disclosed. The cable splicing device comprising a top housing and a bottom housing including a circuit board. The circuit board may comprise a first set of insulation displacement contacts (IDCs) configured to hold a pair of wires from a first single pair ethernet (SPE) cable, a second set of IDCs configured to hold a pair of wires from the first SPE cable, and a third set of IDCs configured to hold a pair of wires from a second SPE cable.

DETAILED DESCRIPTION

This disclosure relates to a splicing connector for use with single pair ethernet (SPE) cables. More specifically, a T-shaped splice adapter is disclosed that splices into a SPE cable to enable an additional cable pathway to be created in parallel with the original cable. The SPE cable being spliced into may be referred to as the trunk cable. Further, the SPE cable may be a solid type, or stranded type, of cable and either a shielded type, or unshielded type, of cable.

The T-splice adapter is spliced into the main trunk cable to create one or more cable drops along the length of the trunk cable, where each cable drop comprises a shorter section of SPE cable (i.e., the spur cable) that is run to other external devices such as sensors or actuators that will now be electrically coupled to the trunk cable in parallel through the T-splice adapter. So the T-splice adapter provides an easy and efficient way for to splice into long runs of the main trunk cable, which enables greater flexibility to dynamically control the cable system's scalability.

Figure 1:
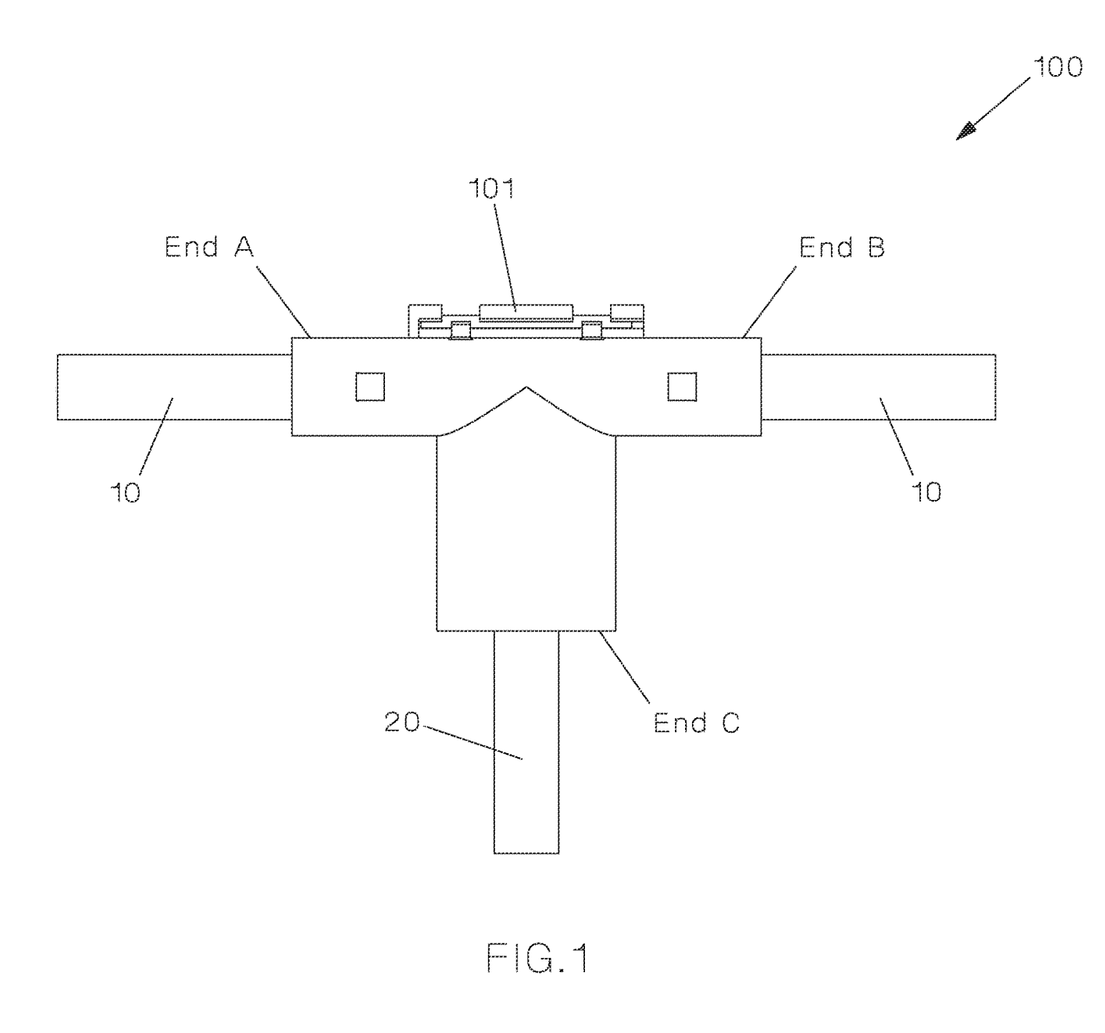
FIG. 1 is a side view of an exemplary T-splice adaptor having cables attached, according to an embodiment.

According to the disclosed embodiments, the T-splice adapter 100 has a "T" shaped body, where the additional spliced in spur cable 20 is perpendicular to the main trunk cable 10, as shown in FIG. 1. As shown in FIG. 1, the trunk cable 10 enters the T-splice adapter 100 at End A and leaves at End B, while the spur cable 20 is spliced into the trunk cable 10 at End C of the T-splice adapter 100. One, or both, of the trunk cable 10 and/or the spur cable 20 are SPE cables. The SPE cable may be comprised of an insulation layer jacket 11 and an internal component comprised of a single pair of copper conductor wires 13, 14 as shown, for example, in FIG. 3A. Also included within the trunk cable 10 shown in FIG. 3A, may be a pair of filler rods 12 that are included to take the place of a second twisted pair of wires that would otherwise be included in other types of cables including two twisted pairs of conductive cables. The filler rods 12 may be installed into the trunk cable 10 to be opposing each other according to some embodiments (see e.g., FIG. 3A), and installed to be adjacent to each other in other embodiments. By including the filler rods 12, the trunk cable 10 is given a more evenly cylindrical shape that can be aesthetically pleasing, and/or provide structural advantages over cables having just the single pair of wires. The filler rods 12 may be made from a plastic polymer material or other non-conductive material. According to other embodiments, the trunk cable 10 may not include the filler rods 12.

Figure 2:
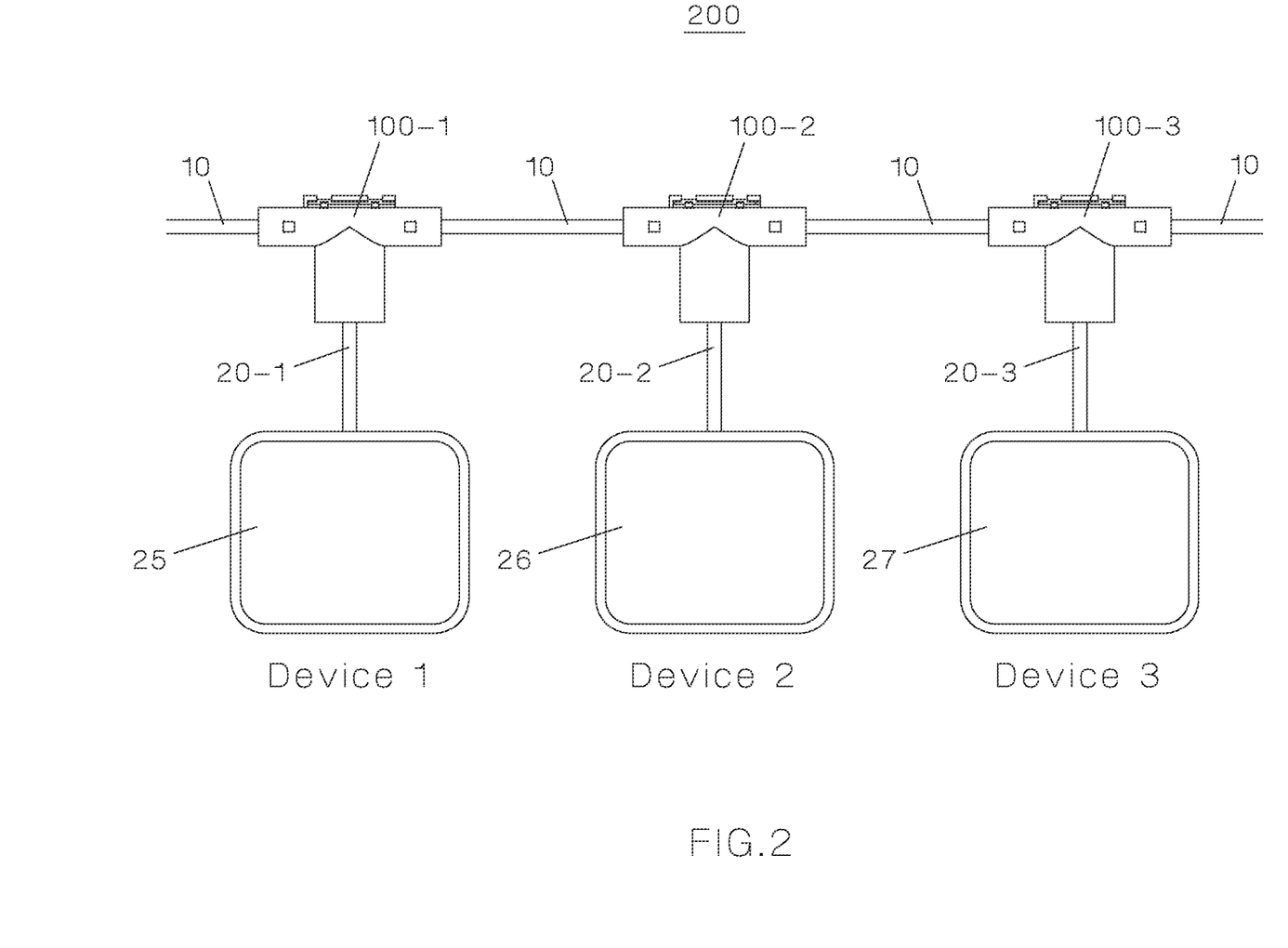
FIG. 2 shows an exemplary cable system in a first configuration where the T-splice adaptor shown in FIG. 1 is used to couple external devices to an SPE cable, according to an embodiment.

FIG. 2 shows an exemplary cable system 200 that includes three T-splice adapters (first T-splice adapter 100-1, second T-splice adapter 100-2, and third T-splice adapter 100-3) being used to splice in three separate external devices (first device 25, second device 26, and third device 27) to be electronically coupled in parallel to the trunk cable 10, via a first spur cable 20-1, a second spur cable 20-2, and a third spur cable 20-3, respectively. The cable system 200 illustrates how a plurality of T-splice adapters 100 may be added to the trunk cable 10 to create multiple drop points where the spur cable 20 can be added to provide power to, receive data from, send data to, and/or otherwise communicate with an external device.

Figure 3A:
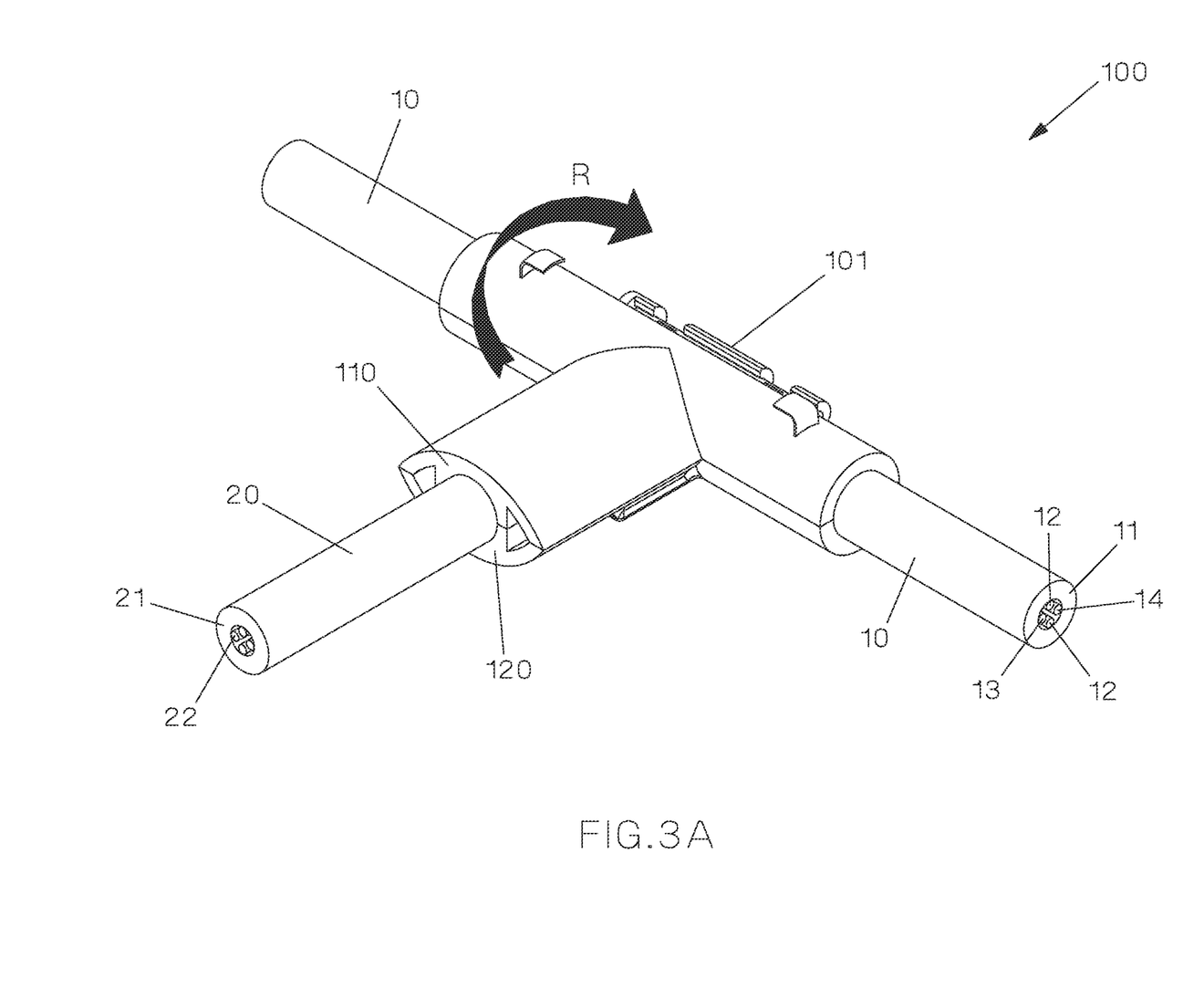
FIG. 3A is a perspective view of the T-splice adapter shown in FIG. 1.

FIG. 3A shows a perspective view of the T-splice adapter 100, where the T-splice adapter 100 is in a closed state having the spur cable 20 spliced into the trunk cable 10. As shown in FIG. 3A, the T-splice adapter 100 is comprised of an outer housing that includes both a top portion 110 and a bottom portion 120. The top portion 110 and the bottom portion 120 are configured to open up relative to each other by rotating about a hinge 101 in a clamshell manner (e.g., as represented by the rotational arrow R). By rotating open to an open state, this enables access to an inner housing of the T-splice adapter 100, which will be described in more detail with reference to FIG. 3B.

Figure 3B:
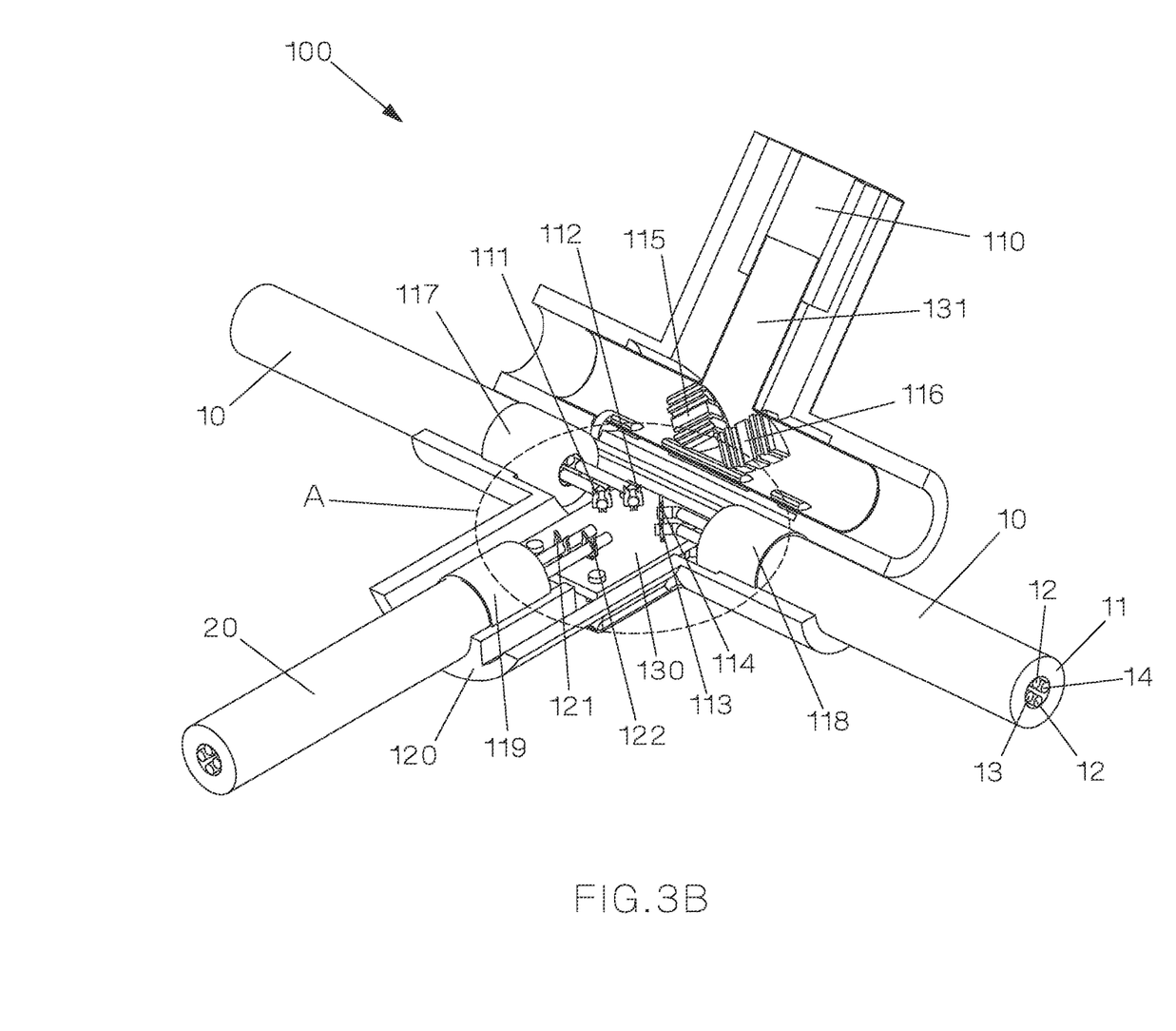
FIG. 3B is a perspective view of the T-splice adapter shown in FIG. 3A, where the T-splice adapter is in an opened state to show internal components.

FIG. 3B shows the T-splice adapter 100 in the open state, where the top portion 110 and/or the bottom portion 120 has rotated about the hinge 101 in the direction represented by the rotational arrow R to open up and enable access to the inner housing. Within the inner housing, the bottom portion 120 of the T-splice adapter 100 includes a circuit board 130 (e.g., printed circuit board (PCB)) configured to provide electrical coupling via conductive traces between components. Included on the circuit board 130 are a plurality of insulation-displacement contacts (IDCs) 111-112, 113-114, and 121-122, where the IDCs may be made from a ferrous alloy having good conductivity characteristics. More specifically, a first set of IDCs 111-112 are positioned on the circuit board 130 to receive and electrically couple to the wire pair of the trunk cable 10 at End A, a second set of IDCs 113-114 are positioned on the circuit board 130 to receive and electrically couple to the wire pair of the trunk cable 10 at End B, and a third set of IDCs 121-122 are positioned on the circuit board 130 to receive and electrically couple to the wire pair of the spur cable 20 at End C.

Figure 4:
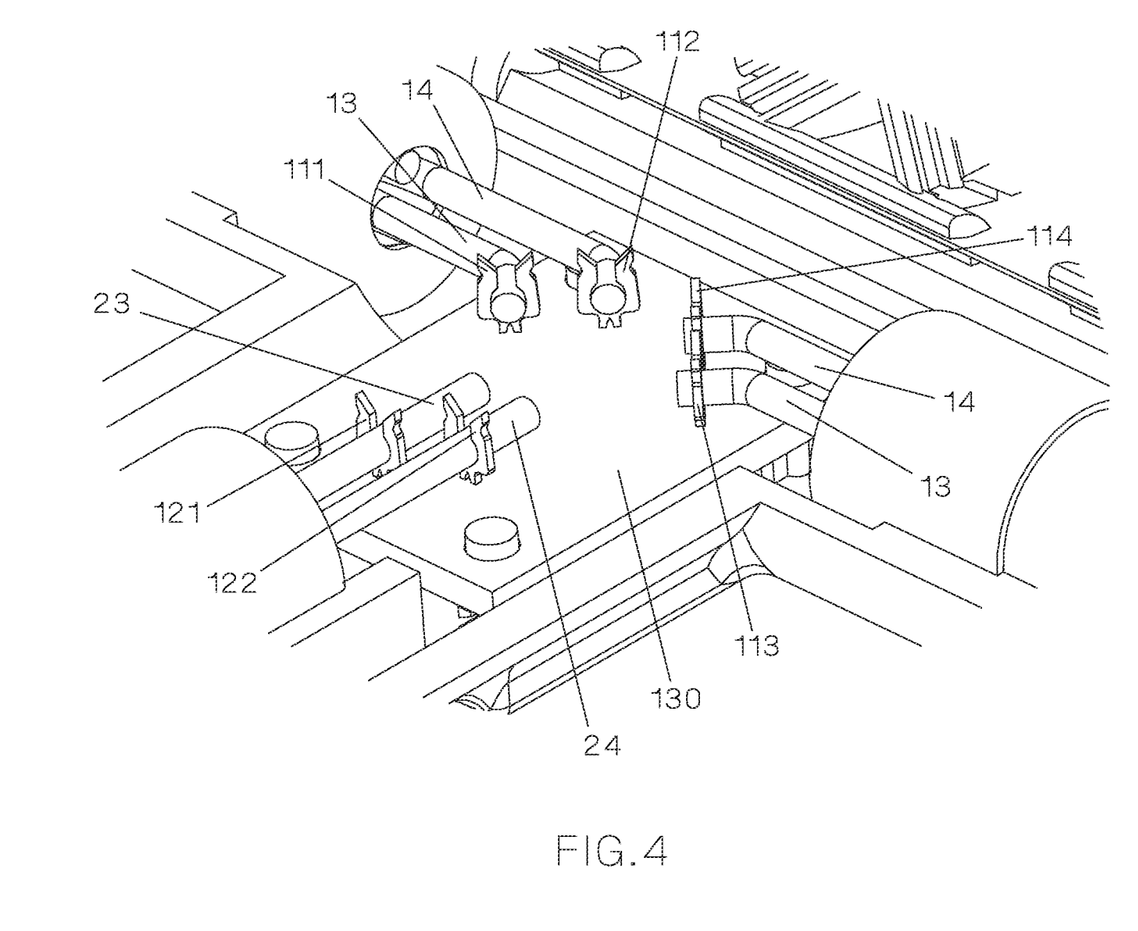
FIG. 4 is a magnified partial view of a section taken from the T-splice adapter shown in FIG. 3B.

FIG. 4 is a magnified partial view of a section A that includes the circuit board 130 from the inner housing shown in FIG. 3B. To splice in the spur cable 20 into the trunk cable 10 using the T-splice adapter 100, the trunk cable 10 is first cut and stripped of its insulation layer jacket 11 to expose the individual copper wires, wire 13 and wire 14, that comprise the single pair. After the wires 13, 14 are exposed and untwisted, they are individually placed into their respective IDCs. For example, a first side of the trunk cable 10 may be placed into a first wire holder 117, and then the corresponding wire 13 is placed into IDC 111 and the corresponding wire 114 is placed into IDC 112. Similarly, a second side of the trunk cable 10 may be placed into a second wire holder 118, and then the corresponding wire 13 is placed into IDC 113 and the corresponding wire 14 is placed into IDC 114.

For the spur cable 20, the spur cable is cut and stripped of its insulation jacket to expose its individual copper wires, wire 23 and wire 24, that comprise the single pair. After the wires 23, 24 are exposed and untwisted, they are individually placed into their respective IDCs. For example, the trunk cable 10 may be placed into a third wire holder 119, and then the corresponding wire 23 is placed into IDC 121 and the corresponding wire 24 is placed into IDC 122.

As shown in FIG. 3B, the top portion 110 also includes a first wire retention feature 115 and a second wire retention feature 116. The first wire retention feature 115 is positioned to interact with the first set of IDCs 111, 112 and the second wire retention feature 116 is positioned to interact with the second set of IDCs 113, 114. According to some embodiments, a third wire retention feature may also be included in the top portion 110 to interact with the third set of IDCs 121, 122. As shown in FIG. 3B, the first wire retention feature 115 and the second wire retention feature 116 are formed integral to the top portion 110 to be included as part of the top half of the inner housing. According to other embodiments, the first wire retention feature 115 and the second wire retention feature 116 may be one or more separate piece that are attached to the inner housing of the top portion 110. The first wire retention feature 115 and the second wire retention feature 116 are made from a polymer material having a stiff nature to ensure enough resiliency to force the wires 13, 14 further into the IDCs 111, 112 when the top portion 110 is rotated to meet with the bottom portion 120 in the closed state.

Figure 12:
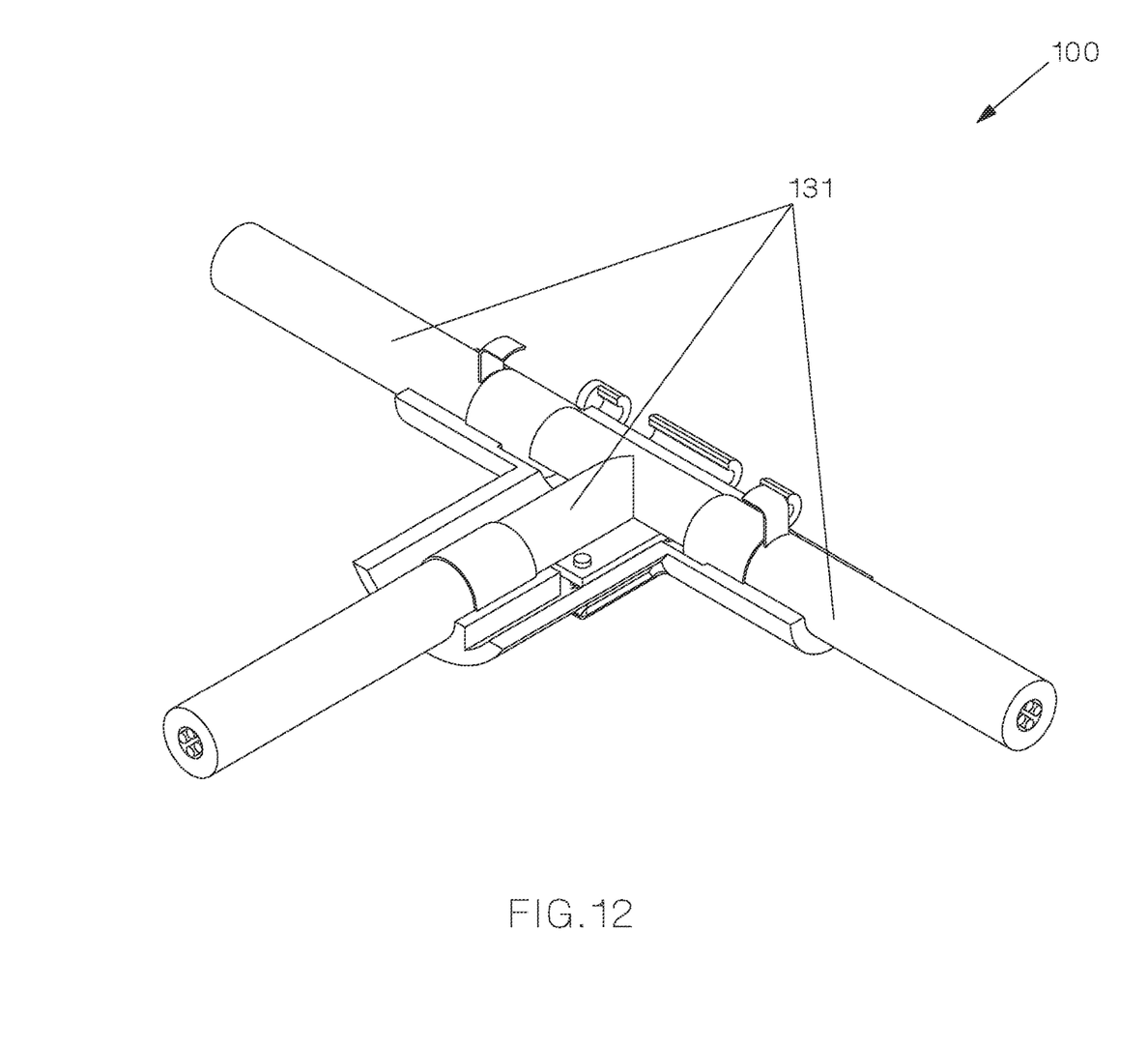
FIG. 12 shows a perspective view into an inner housing of the T-splice adapter by removing a top portion of the T-splice adapter.

Also included in the top portion 110 is a conductive plating 131 that provides additional shielding for the cables. The conductive plating 131 is configured to be in contact with one or more of the wire holders 117, 118, 119 when the T-splice adapter 100 is in a closed state to provide a shielding feature that ensures that there is sufficient shielding maintained between the trunk cable 10 and the spur cable 20. FIG. 12 shows another view of the conductive plating 131 when the conductive plating 131 is placed to cover the individual wires 13, 14, 23, 24 that are now housed within the inner housing of the T-splice adapter 100. The conductive plating 131 is used to ensure shielding for each section of the trunk cable 10 and the spur cable 20. The shielding feature provided by the conductive plating 131 works to reduce the effects that electromagnetic radiation has on the wire conductors in the trunk cable 10 and/or spur cable 20.

The trunk cable 10 and/or spur cable 20 themselves may further include a shielding layer that goes around their conductive wires, positioned between their conductive wires and insulation layer. The shielding layer may be made from a material in the form of metalized foil (mylar substrate with metallic components to form a foil), metallic overbraid (wire woven to form a shield of various densities, expressed as "% coverage"), or a combination of both that surrounds the wire conductors. The conductive plating 131 may be made from a material that is the same, or similar, to that of the shielding layer.

Figure 6:
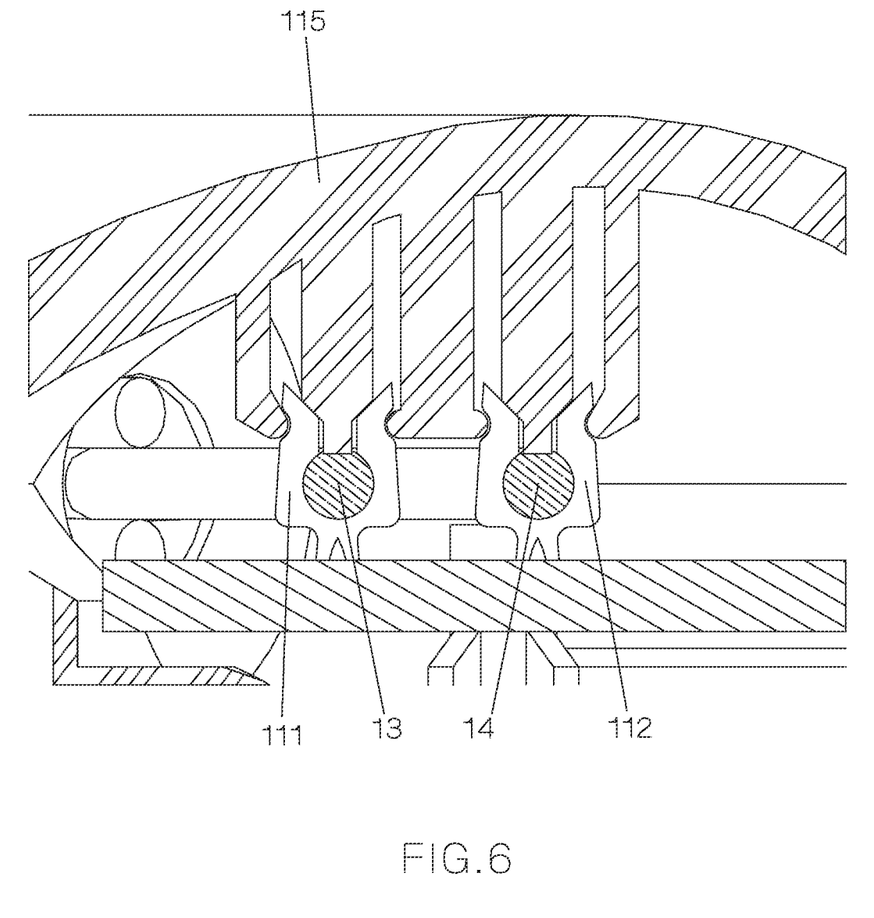
FIG. 6 is a magnified partial view of a stabilizing component included in the T-splice adapter shown in FIG. 1, where the stabilizing component stabilizes wires held by insulation displacement contacts when the T-splice adaptor is in a closed state.

The wire retention features 115, 116 are configured to securely install the individual wires into their respective IDCs, and/or maintain the individual wires within their respective IDCs when the top portion 110 is closed and the T-splice adapter 100 is in the closed state. For example, according to an alternative installation method, the prepped wires 13, 14 may be placed into a lead-in portion on a top half of their respective IDCs 111-114. Then when the top portion 110 is closed into the closed state, the first wire retention feature 115 will abut against and push down the wires 13, 14 into an installed position on their respective IDCs 111, 112 where the IDCs 111, 112 will have penetrated any insulation layer on the wires 13, 14 to make contact with the conductive wire cores. Similarly, when the top portion 110 is closed into the closed state, the second wire retention feature 116 will abut against and push down the wires 13, 14 into an installed position on their respective IDCs 113, 114 where the IDCs 111, 112 will have penetrated any insulation layer on the wires 13, 14 to make contact with the conductive wire cores. FIG. 6 is a cut-away side view of the first set of IDCs 111, 112 when the T-splice adapter 100 is in the closed state, that further shows how the shape and positioning of the first wire retention feature 115 works to keep the wire 13 securely within its respective IDC 111, and the wire 14 securely within its respective IDC 112.

Figure 5:
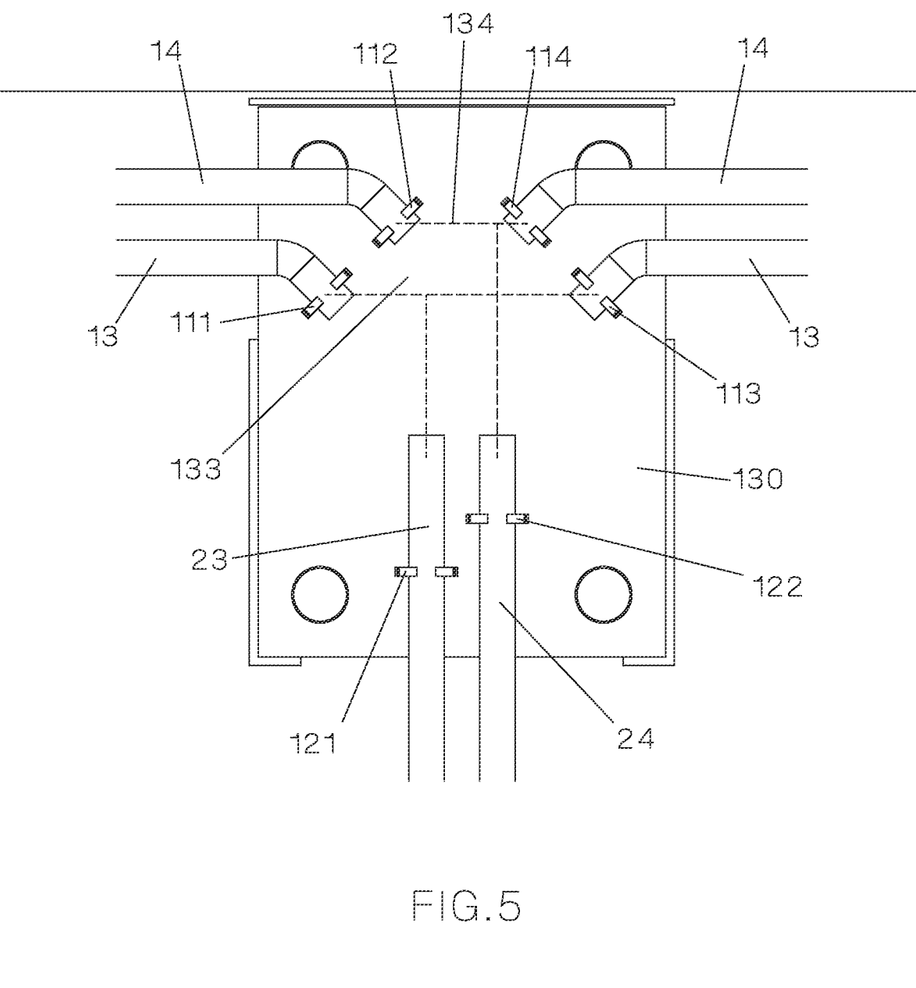
FIG. 5 is a partial view taken from the T-splice adapter shown in FIG. 4 of a printed circuit board included in the T-splice adapter.

After the wires 13, 14 of the trunk cable 10 and the wires 23, 24 of the spur cable 20 are successfully installed on their respective IDCs 111-112, 113-114, 121-122, power and/or data may be communicated between the spur cable 20 and the trunk cable 10. The electrical communication between the trunk cable 10 and the spur cable 20 is provided by the layout of the traces in the circuit board 130. FIG. 5 shows an exemplary tracing map that includes a first tracing 133 that couples the first wire 13 from End A to End B in the T-splice adapter 100, while also coupling the first wire 13 in the trunk cable 10 to the first wire 23 in the spur cable 20. The tracing map also includes a second tracing 134 that couples the second wire 14 from End A to End B in the T-splice adapter 100, while also coupling the second wire 14 in the trunk cable 10 to the second wire 24 in the spur cable 20.

In addition or alternatively, the wires 13, 14 of the trunk cable 10 may be electrically coupled to the wires 23, 24 using a physical termination apparatus such as compression using a screw.

Figure 7:
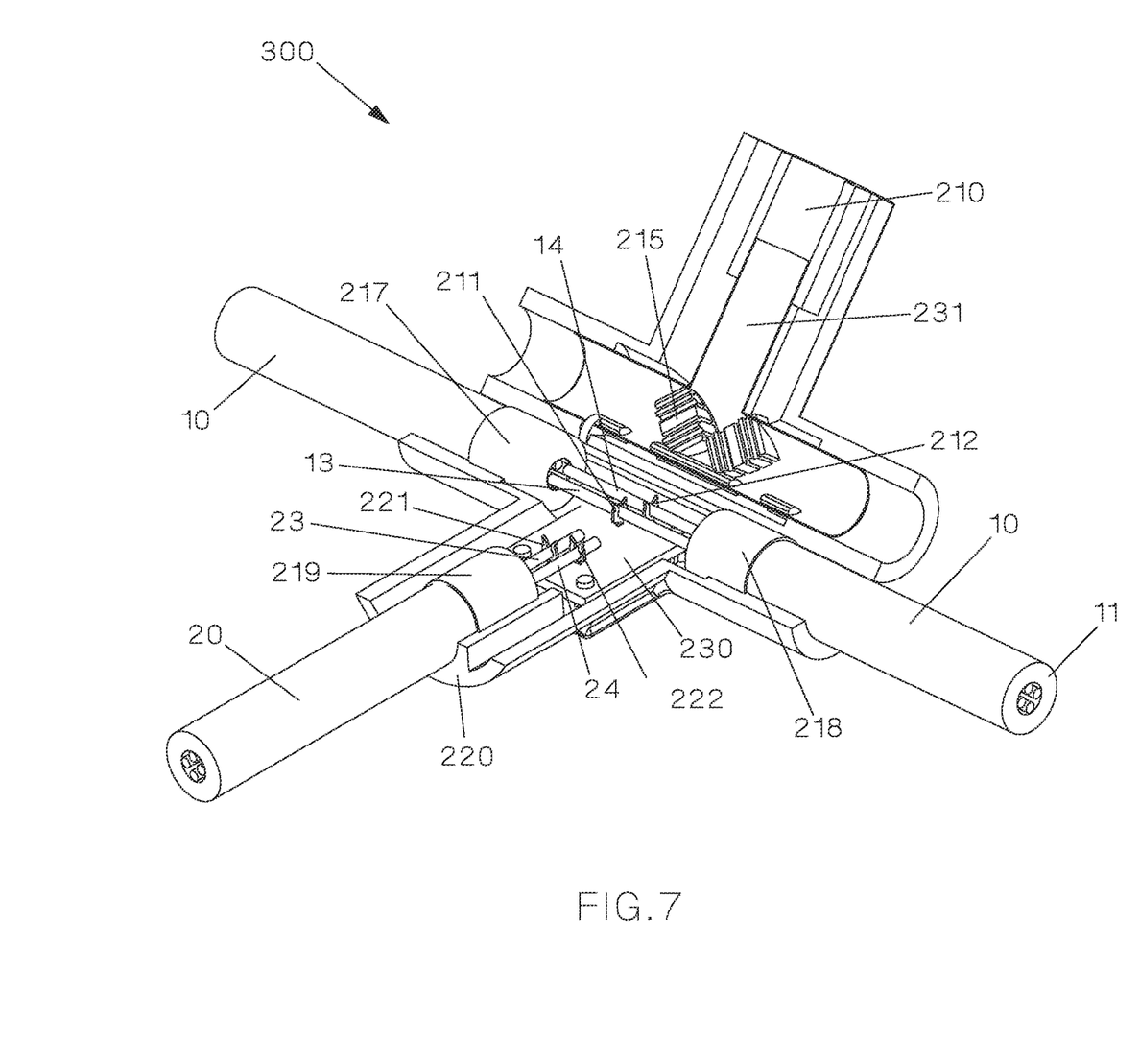
FIG. 7 is a perspective view of a T-splice adapter in an opened state to show internal components, according to an alternative embodiment.

FIG. 7 shows an exemplary T-splice adapter 300 according to an alternative embodiment where the wires 13, 14 from the trunk cable 10 are not cut/split into two separate pieces. Here, many of the components in the T-splice adapter 300 are the same as those included in the T-splice adapter 100. For example, the T-splice adapter 300 includes a top portion 210 and a bottom portion 220 configured to rotate about a hinge in clamshell manner. The bottom portion 220 includes a first wire holder 217 for holding a portion of the trunk cable 10 at End A, a second wire holder 218 for holding a portion of the trunk cable at End B, and a third wire holder for holding a portion of the spur cable 20 at End C.

Also, the T-splice adapter 300 includes an inner housing that includes a circuit board 230. The circuit board 230 includes a set of IDCs 221, 222 for receiving and holding the wires 23, 24 of the spur cable 20. A difference offered by the T-splice adapter 300 over the T-splice adapter 100 is the circuit board 230 including only a single set of IDCs 211, 212 for receiving and holding the wires 13, 14 of the trunk cable 10. Only the single set of IDCs 211, 212 is needed for the wires 13, 14 of the trunk cable 10 because the trunk cable 10 is not cut into two separate pieces as is done for the T-splice adapter 100.

So for the T-splice adapter 300, instead of cutting the wires 13, 14 from the trunk cable 10 all the way through to create two separate pieces requiring both the first set of IDCs 111, 112 and the second set of IDCs 113, 114 shown to be included in the T-splice adapter 100, the T-splice adapter 300 according to this alternative embodiment does not cut through the wires 13, 14 from the trunk cable 10 into separate pieces. It follows that in the T-splice adapter 300 of this alternative embodiment, only a single set of IDCs 211, 212 is provided on the circuit board 230 for receiving and holding the wires 13, 14 of the trunk cable 10.

The installation process using the T-splice adapter 300 includes removing the outer insulation layer jacket 11 from a portion of the trunk cable 10 that will be placed between a first wire holder 217 and a second wire holder 218. The exposed wires 13, 14 are then installed onto their respective IDCs 211, 212 corresponding to the trunk cable 10. A wire retention feature 215 is included on the top portion 210 for securing the wires 13, 14 into their respective IDCs 211, 212, similar (or the same) to how the wire retention feature 115 is shown to operate in FIG. 6. For example, when the top portion 210 is closed into the closed state, the wire retention feature 215 will abut against and push down the wires 13, 14 into an installed position on their respective IDCs 211, 212 where the IDCs 211, 212 will have penetrated any insulation layer on the wires 13, 14 to make contact with the conductive wire cores. Once in the closed state, the wire retention feature 215 is shaped to lay on top of the IDCs 211, 212 to secure the wires 13, 14 within their respective IDCs 211, 212 as shown in FIG. 6. The top portion 210 also includes a conductive plating 231 for providing the shielding characteristics discussed herein with reference to the conductive plating 131 for the T-splice adapter 100.

Figure 8:
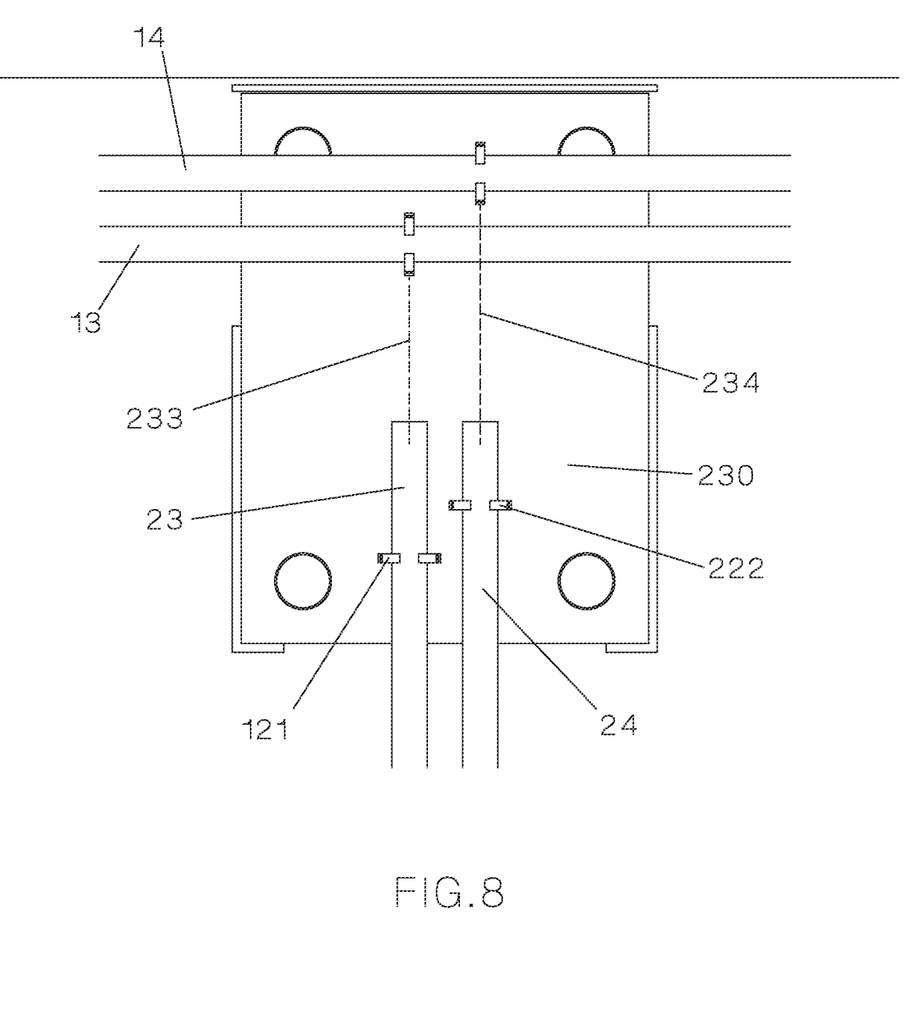
FIG. 8 is a partial view taken from the T-splice adapter shown in FIG. 7 of a printed circuit board included in the T-splice adapter.

After the installation process is completed and the T-splice adapter 300 is in the closed state, the spur cable 20 will be spliced into the trunk cable 10 via the tracing map on the circuit board 230, as shown in FIG. 8. According to the tracing map shown in FIG. 8, a first trace 233 electrically couples the first wire 13 of the trunk cable 10 to the first wire 23 of the spur cable 20, and a second trace 234 electrically couples the second wire 14 of the trunk cable 10 to the second wire 24 of the spur cable 20.

Figure 9:
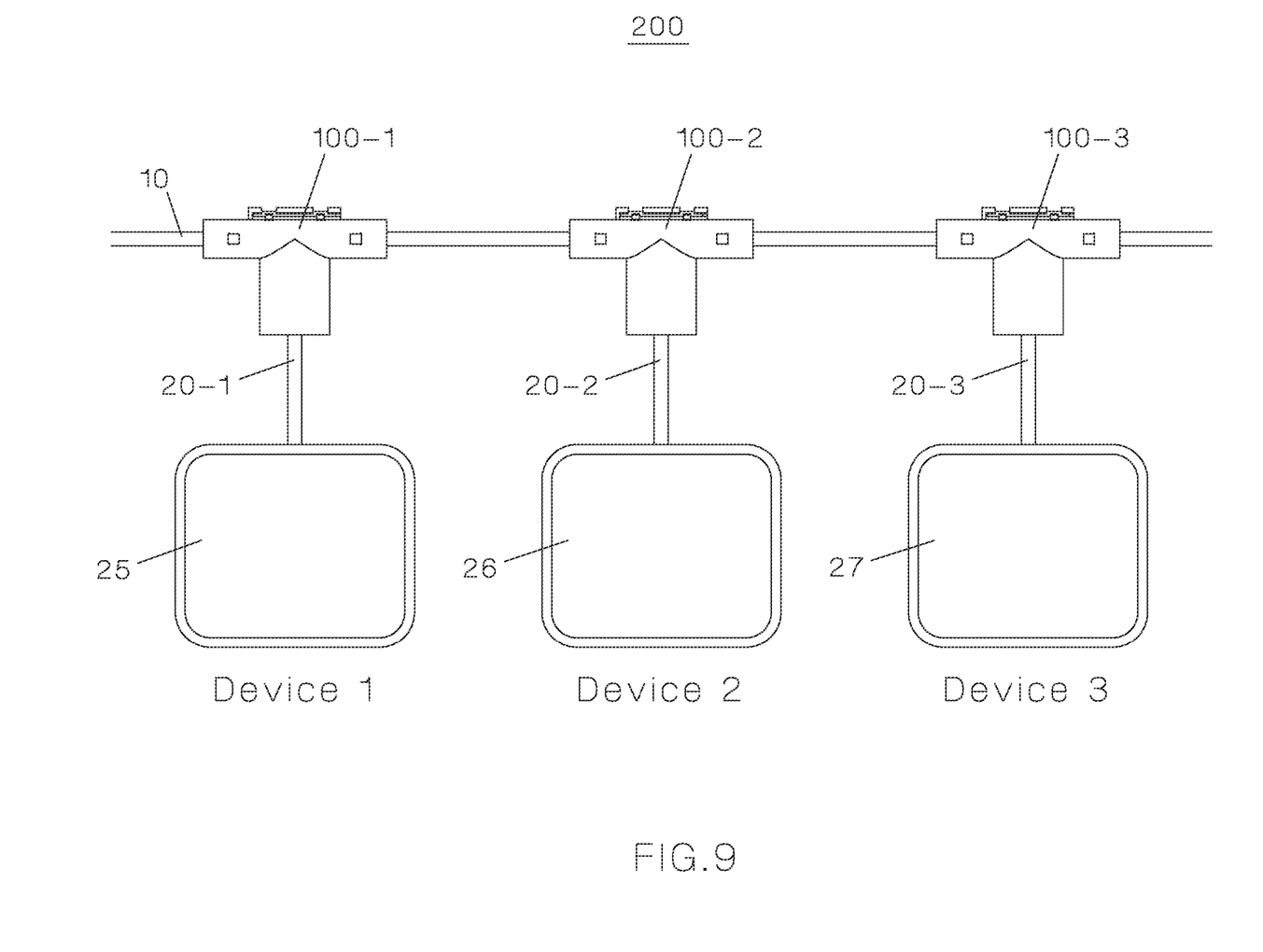
FIG. 9 shows an exemplary cable system in a second configuration including the T-splice adapter.

The circuit board 130, but also applicable to the circuit board 230, may be configured to allow for additional functions to be achieved and/or added to the external device being spliced into the trunk cable 10 via the spur cable 20. For example, when the circuit board 130 is configured to include a built-in terminating resistance, the T-splice adapter 100 can be used at the end of a cable system 200 to terminate a section as shown in FIG. 9. The cable system 200 shown in FIG. 9 is similar to the cable system 200 shown in FIG. 2, however in FIG. 9 the cable system 200 has installed the third T-splice adapter 100-3 at the edge to terminate the particular section of the cable system 200 at the edge. To achieve this capability of being used as an end piece, the built-in terminating resistance of the third T-splice adapter 100-3 is configured to equal to the specified characteristic impedance of the trunk cable 10. For example, if the trunk cable 10 has a specified characteristic impedance of 100 ohms, the third T-splice adapter 100-3 is produced with a built-in terminating resistance of at least 100 ohms.

Figure 10:
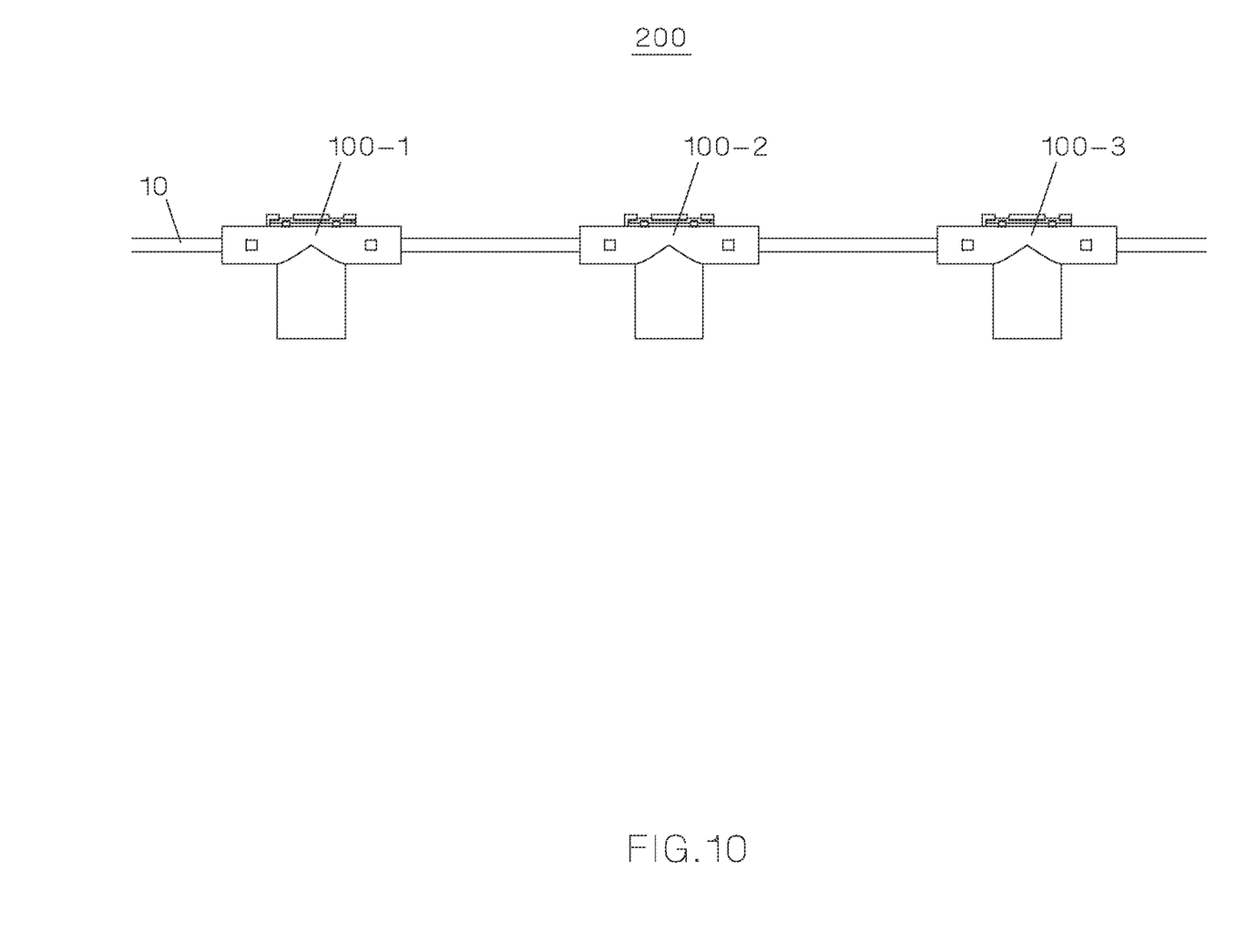
FIG. 10 shows an exemplary cable system in a third configuration including the T-splice adapter.
Figure 11:
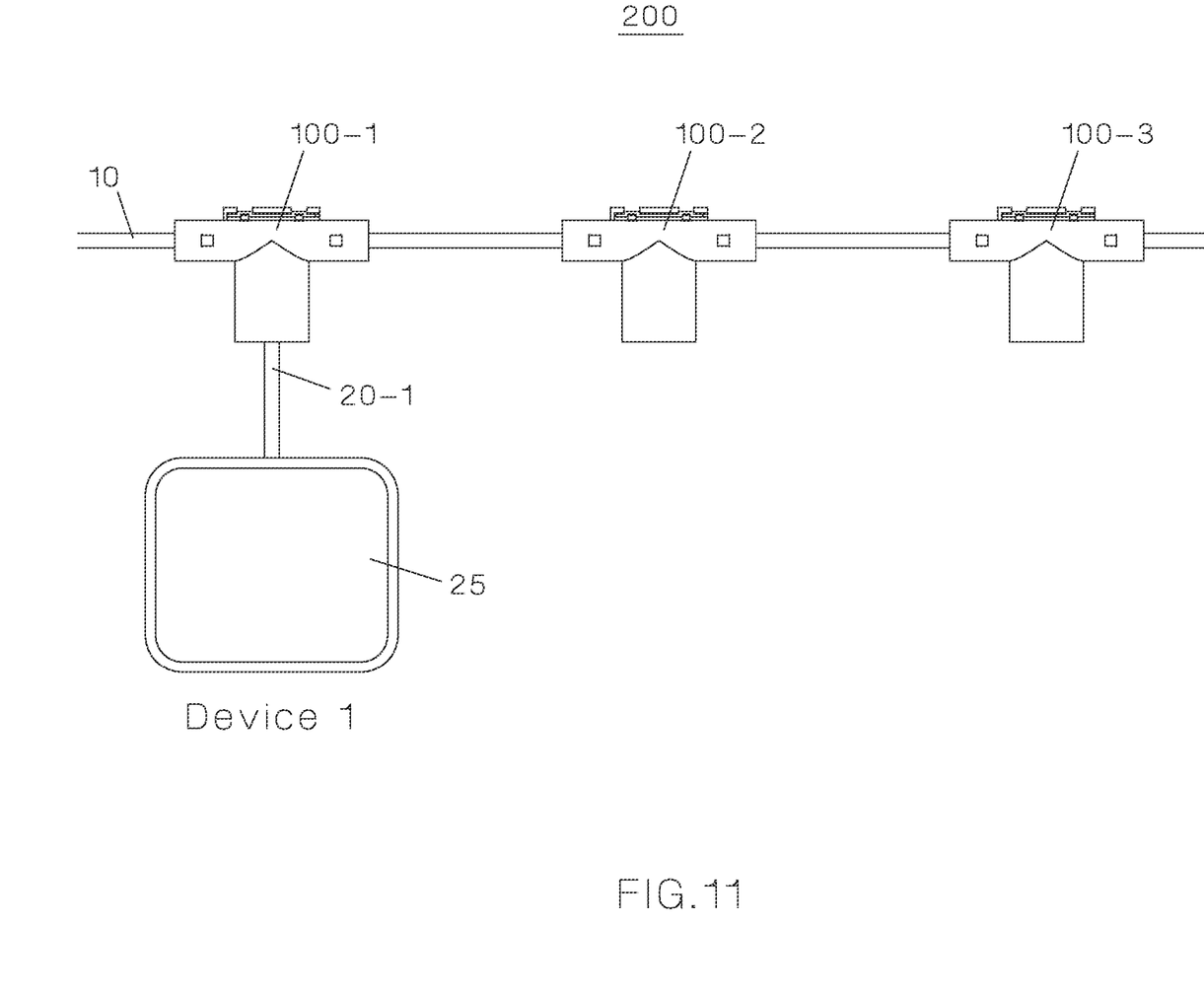
FIG. 11 shows an exemplary cable system in a fourth configuration including the T-splice adapter.

By configuring the circuit board 130 with the proper level of resistance, the T-splice adapter 100 can also act as its own spur device in cases where the T-splice adapter 100 is added at different lengths of the trunk cable 10 in anticipation of splicing in external devices in future applications. To achieve this feature where the T-splice adapter 100 can be used as its own spur device within the electrical circuitry, the T-splice adapter 100 is produced to further include a termination resistor that remains electrically connected to the circuit provided by the trunk cable 10 until the spur cable 20 is connected to the T-splice adapter 100. In doing so, the bus does not see open circuit points where the spur cable 20 is not connected during the original installation of the T-splice adapter 100 to the trunk cable 10. This scenario is shown in FIG. 10 where the cable system 200 is shown to include the T-splice adapters 100-1 to 100-3 installed onto the trunk cable 10 without necessarily splicing in the spur cable 20 or external devices 25-27 yet. Then later, FIG. 11 shows a future event where the first external device 25 has been spliced into the trunk cable 10 by simply attaching the spur cable 20-1 and attaching the first device 21 to the spur cable 20-1 at the first T-splice adapter 100-1. In this way, the T-splice adapter 100 offers a more efficient and convenient capability to anticipate the need to splice in additional devices to the cable system including the T-splice adapter 100. This translates to cost and resource savings.

According to an exemplary embodiment for attaching cables to the T-splice adapter 100 during an installation process, one or more of the following processes may be implemented: opening the clam shell outer housing of the T-splice adapter 100 to separate the top portion 110 from the bottom portion 120, electrically coupling a first wire and a second wire of the trunk cable 10 to the first set of IDCs 111-112 located at a first end of the T-splice adapter 100, electrically coupling the first wire and the second wire of the trunk cable 10 to the second set of IDCs 113-114, and electrically coupling a first wire and a second wire of the spur cable 20 to the third set of IDCs 121-122. Electrically coupling the first wire and the second wire of the trunk cable 10 into the first set of IDCs 111-112 may include cutting the trunk cable 10 and fitting a first portion of the trunk cable 10 into the first wire holder 117, and electrically coupling the first wire and the second wire of the trunk cable 10 into the second set of IDCs 111-112 may include fitting a second portion of the trunk cable 10 into the second wire holder 118. Electrically coupling the first wire and the second wire of the spur cable 20 to the third set of IDCs 121-122 may include fitting a portion of the spur cable 20 into the third wire holder 119. The installation process may further include closing the clam shell outer housing of the T-splice adapter 100 to bring the top portion 110 and the bottom portion 120 together such that a conductive plating 131 contacts at least one of the first wire holder 117, the second wire holder 118, or the third wire holder 119. The installation process may further include installing an external device (e.g., sensor) to the spur cable 20.

Furthermore, while the particular embodiments described herein have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective.

What is claimed is:

1. A cabling device comprising:
   a circuit board comprising:
      a first set of insulation displacement contacts (IDCs) configured to hold at least one wire from a first cable; and
      a second set of IDCs configured to hold at least one wire from a second cable;
   a first wire holder configured to hold a portion of the first cable;
   a second wire holder configured to hold a portion of the second cable;
   a top housing;
   a bottom housing;
   a conductive material positioned to cover at least a portion of the first cable and at least a portion of the second cable when the cabling device is in a closed state; and
   a conductive plate located within an inner housing and configured to be in electrical contact with the first wire holder and the second wire holder when the cabling device is in the closed state.

2. The cabling device of claim 1, wherein the at least one wire from the first cable is electrically coupled to the at least one wire from the second cable via at least one conductive trace between the first set of IDCs and the second set of IDCs.

3. The cabling device of claim 1, wherein the conductive material is a metalized foil material.

4. The cabling device of claim 1, wherein the top housing and the bottom housing are connected via a hinge configured to be a rotation point for the top housing and the bottom housing to rotate in a clamshell manner between an open state and the closed state.

5. The cabling device of claim 1, wherein the top housing further comprises:
   a wire retention feature configured to secure the at least one wire from the first cable within the first set of IDCs when the cable device is in the closed state.

6. The cabling device of claim 1, further comprising:
   a first wire holder configured to hold a portion of the first cable; and
   a second wire holder configured to hold a portion of the second cable.

7. The cabling device of claim 1, wherein the first cable is a single pair ethernet cable.

8. The cabling device of claim 1, wherein the circuit board is configured to have an internal resistance to allow the cable device to be used as a termination end to the first cable.

9. The cabling device of claim 1, wherein the circuit board is configured to have an internal resistance to allow the cable device to be its own spur device.

10. The cabling device of claim 1, wherein the second cable is a single pair ethernet cable.

11. The cabling device of claim 1, wherein the first cable includes a pair of filler rods.

12. The cabling device of claim 11, wherein the pair of filler rods are installed opposite each other.

13. A method for installing a trunk cable to a splice adapter, the method comprising:
   opening the splice adapter to separate a top portion of the splice adapter from a bottom portion of the splice adapter;
   electrically coupling a first wire and a second wire of the trunk cable to a first IDC and a second IDC, respectively, wherein the first IDC and the second IDC are included as part of a first set of IDCs;
   electrically coupling a first wire and a second wire of a spur cable to a third IDC and a fourth IDC, respectively, wherein the third IDC and the fourth IDC are included as part of a second set of IDCs; and
   wherein the first set of IDCs and the second set of IDCs are included on a circuit board, where the circuit board is configured to have an internal resistance to allow the splice adapter to be used as a termination end to the first cable.

14. The method of claim 13, further comprising:
   fitting a first portion of the trunk cable into a first wire holder;
   fitting an end portion of the spur cable into a second wire holder; and
   closing the splice adapter to a closed state so that the top portion and the bottom portion come together and a conductive material placed within the top portion electrically couples to at least one of the first wire holder or the second wire holder.

15. The method of claim 14, wherein the conductive material is a metalized foil material.

16. The method of claim 13, further comprising:
   installing an external device to the spur cable.

17. The method of claim 13, wherein the top portion of the splice adapter includes a wire retention feature configured to secure the first wire and the second wire of the trunk cable within the first set of IDCs when the splice adapter is in a closed state.

18. The method of claim 13, wherein at least one of the trunk cable and the spur cable is a single pair ethernet cable.

\* \* \* \* \*